US00RE41761E

(19) United States
(12) Reissued Patent
Wiseman et al.

(10) Patent Number: US RE41,761 E
(45) Date of Reissued Patent: Sep. 28, 2010

(54) GRAY-WATER RECYCLING SYSTEM

(76) Inventors: Cecil A. Wiseman, 520 Bucketts Way, Wards River, New South Wales 2422 (AU); Christopher Wiseman, P.O. Box 8089, Coffs Harbour, New South Wales 2450 (AU)

(21) Appl. No.: 10/798,250

(22) Filed: Mar. 11, 2004

Related U.S. Patent Documents

Reissue of:
(64) Patent No.: 6,355,160
Issued: Mar. 12, 2002
Appl. No.: 09/621,446
Filed: Jul. 21, 2000

(51) Int. Cl.
*A47K 4/00* (2006.01)

(52) U.S. Cl. ..... 210/90; 210/97; 210/136; 210/137; 210/257.1; 210/258; 4/661; 4/665; 137/114

(58) Field of Classification Search ..... 210/90, 210/97, 136, 137, 257.1, 258; 4/665, 661; 137/114
See application file for complete search history.

(56) References Cited

U.S. PATENT DOCUMENTS 2,311,851 A * 2/1943 McClure ..... 137/113
3,915,857 A * 10/1975 Olson ..... 210/668
4,145,279 A * 3/1979 Selby, III ..... 210/614
4,162,218 A * 7/1979 McCormick ..... 210/104
4,228,006 A * 10/1980 Hanna ..... 210/167.3
5,106,493 A * 4/1992 McIntosh ..... 210/100
5,303,728 A * 4/1994 Senatore ..... 137/113
5,317,766 A * 6/1994 McDonald et al. ..... 4/665
5,406,657 A * 4/1995 Donati ..... 4/665
5,845,346 A * 12/1998 Johnson, Jr. ..... 4/665

* cited by examiner

*Primary Examiner*—Terry K Cecil

(57) ABSTRACT

A gray-water recycling system for reclaiming gray-water for use in toilets and lawn care. The system includes a reservoir adapted to treat gray-water and includes an intake pipe, an outlet pipe and an overflow pipe. An inlet coupled to the intake pipe supplies gray-water to the reservoir. A filter is fluidly coupled to the outlet pipe for filtering gray-water to define processed gray-water. A pump is fluidly coupled to the by a pipe. A first valve (24) controls flow of the processed gray-water from the pump. The first valve is fluidly coupled to the pump, a fresh water inlet and a processed gray-water outlet. The first valve is adapted to open the fresh water if the water pressure from the processed gray-water falls. Also included is a pressure valve (52) adapted to manually adjust the pressure of the processed gray-water outlet and to allow a flow of fresh water in the event the solenoid of the first valve fails to operate.

33 Claims, 2 Drawing Sheets

GRAY-WATER RECYCLING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to gray-water reclamation systems and more particularly pertains to a new gray-water recycling system for reclaiming gray-water for use in toilets and lawn care.

2. Description of the Prior Art

The use of gray-water reclamation systems is known in the prior art. More specifically, gray-water reclamation systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,106,493; U.S. Pat. No. 5,317,766; U.S. Pat. No. 4,145,279; U.S. Pat. No. 5,406,657; U.S. Pat. No. 4,162,218; and U.S. Pat. No. 3,915,857.

While these devices fulfill their respective, particular objectives and requirements, the aforementioned patents do not disclose a new gray-water recycling system. The inventive device includes a reservoir, which is adapted to treat gray-water. The reservoir has an intake pipe, an outlet pipe and an overflow pipe. An inlet supplies gray-water to the reservoir. The inlet is fluidly coupled to the intake pipe. A filtering means filters the gray-water. The filtering means is fluidly coupled to the outlet pipe. The gray-water is filtered through the filter such that the filtered water is defined as processed gray-water. A pumping means draws the gray-water through the filtering means. The pumping means is fluidly coupled to the filtering means by a pipe. A first valve controls flow of the processed gray-water from the pumping means. The first valve has a first end, a second end and middle section. The first end is fluidly coupled to the pumping means by a pipe. The second end is fluidly coupled to a fresh water inlet. A middle section of the first valve is fluidly coupled to a processed gray-water outlet. The first valve is adapted to open the fresh water if the water pressure from the processed gray-water falls.

In these respects, the gray-water recycling system according to the present invention substantially departs from the conventional concepts and designs of the prior art, and in so doing provides an apparatus primarily developed for the purpose of reclaiming gray-water for use in toilets and lawn care.

SUMMARY OF THE INVENTION

In view of the foregoing disadvantages inherent in the known types of gray-water reclamation systems now present in the prior art, the present invention provides a new gray-water recycling system construction wherein the same can be utilized for reclaiming gray-water for use in toilets and lawn care.

*As used through this disclosure, the term "gray-water" is meant to include non-potable water. Illustrative examples of such non-potable water include water reclaimed from a prior use (showers, sinks, washing machines, dishwashers and the like), or may come from other sources prior to treatment for human consumption (wells, dams, rivers, lakes, and the like.*

The general purpose of the present invention, which will be described subsequently in greater detail, is to provide a new gray-water recycling system apparatus and method which has many of the advantages of the gray-water reclamation systems mentioned heretofore and many novel features that result in a new gray-water recycling system which is not anticipated, rendered obvious, suggested, or even implied by any of the prior art gray-water reclamation systems, either alone or in any combination thereof.

To attain this, the present invention generally comprises a reservoir, which is adapted to treat gray-water. The reservoir has an intake pipe, an outlet pipe and an overflow pipe. An inlet supplies gray-water to the reservoir. The inlet is fluidly coupled to the intake pipe. A filtering means filters the gray-water. The filtering means is fluidly coupled to the outlet pipe. The gray-water is filtered through the filter such that the filtered water is defined as processed gray-water. A pumping means draws the gray-water through the filtering means. The pumping means is fluidly coupled to the filtering means by a pipe. A first valve controls flow of the processed gray-water from the pumping means. The first valve has a first end, a second end and middle section. The first end is fluidly coupled to the pumping means by a pipe. The second end is fluidly coupled to a fresh water inlet. A middle section of the first valve is fluidly coupled to a processed gray-water outlet. The first valve is adapted to open the fresh water if the water pressure from the processed gray-water falls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present inventions It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gray-water recycling system apparatus and method which has many of the advantages of the gray-water reclamation systems mentioned heretofore and many novel features that result in a new gray-water recycling system which is not anticipated, rendered obvious, suggested, or even implied by any of the prior art gray-water reclamation systems, either alone or in any combination thereof.

It is another object of the present invention to provide a new gray-water recycling system which may be easily and efficiently manufactured and marketed.

It is a further object of the present invention to provide a new gray-water recycling system which is of a durable and reliable construction.

An even further object of the present invention is to provide a new gray-water recycling system which is susceptible of a low cost of manufacture with regard to both materials and labor, and which accordingly is then susceptible of low prices of sale to the consuming public, thereby making such gray-water recycling system economically available to the buying public.

Still yet another object of the present invention is to provide a new gray-water recycling system which provides in the apparatuses and methods of the prior art some of the advantages thereof, while simultaneously overcoming some of the disadvantages normally associated therewith.

Still another object of the present invention is to provide a new gray-water recycling system for reclaiming gray-water for use in toilets and lawn care.

Yet another object of the present invention is to provide a new gray-water recycling system which includes a reservoir, which is adapted to treat gray-water. The reservoir has an intake pipe, an outlet pipe and an overflow pipe. An inlet supplies gray-water to the reservoir. The inlet is fluidly coupled to the intake pipe. A filtering means filters the gray-water. The filtering means is fluidly coupled to the outlet pipe. The gray-water is filtered through the filter such that the filtered water is defined as processed gray-water. A pumping means draws the gray-water through the filtering means. The pumping means is fluidly coupled to the filtering means by a pipe. A first valve controls flow of the processed gray-water from the pumping means. The first valve has a first end, a second end and middle section. The first end is fluidly coupled to the pumping means by a pipe. The second end is fluidly coupled to a fresh water inlet. A middle section of the first valve is fluidly coupled to a processed gray-water outlet. The first valve is adapted to open the fresh water if the water pressure from the processed gray-water falls.

Still yet another object of the present invention is to provide a new gray-water recycling system that allows for use of gray-water for watering lawns.

Even still another object of the present invention is to provide a new gray-water recycling system that contains a pressure stabilization means to insure that the pressure from the system remains relatively constant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
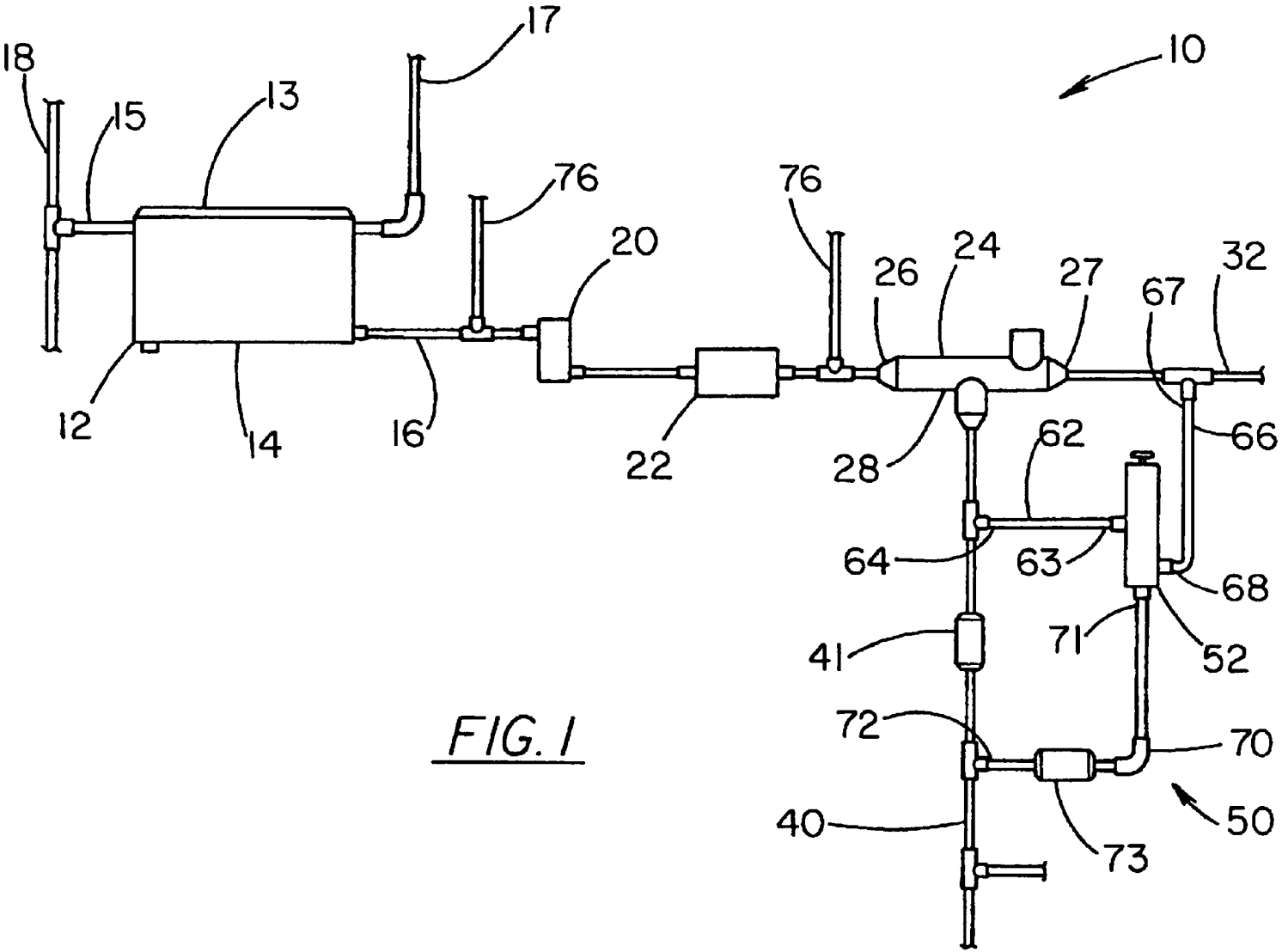
FIG. 1 is a schematic plan view of a new gray-water recycling system according to the present invention.
Figure 2:
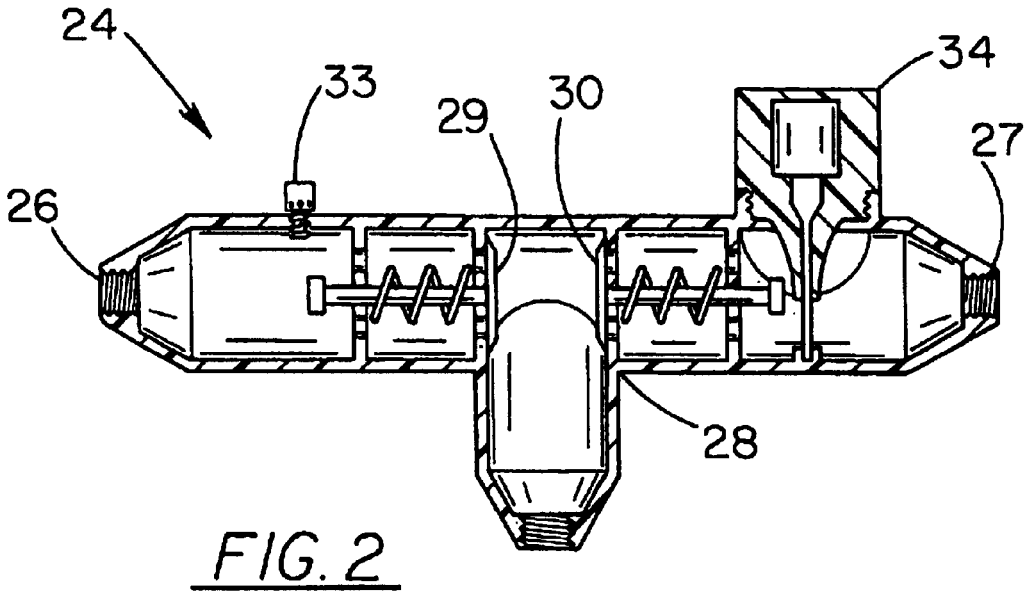
FIG. 2 is a schematic cross-sectional view the first valve of the present invention.
Figure 3:
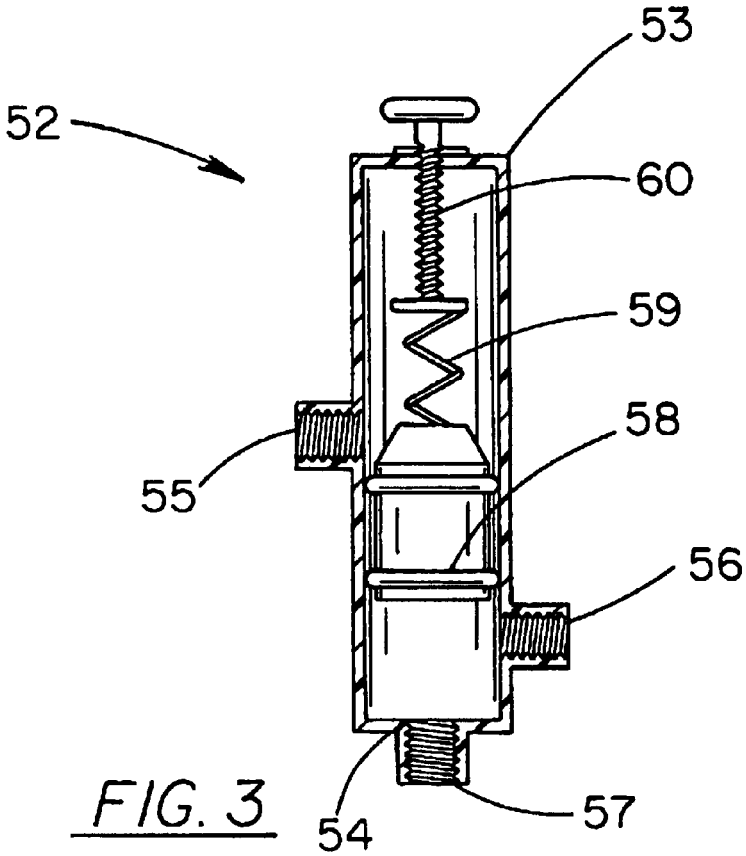
FIG. 3 is a schematic cross-sectional view of the pressure valve of the present invention.

With reference now to the drawings, and in particular to FIGS. 1 through 3 thereof, a new gray-water recycling system embodying the principles and concepts of the present invention and generally designated by the reference numeral 10 will be described.

As best illustrated in FIGS. 1 through 3, the gray-water recycling system 10 generally comprises a reservoir 12. The reservoir 12 is adapted to treat gray-water using conventional treatment means. The reservoir has a top side 13 and a bottom side 14. The reservoir 12 has an intake pipe 15, an outlet pipe 16 and an overflow pipe 17. The outlet pipe 16 is positioned generally adjacent to the bottom side 14 of the reservoir 12. The overflow pipe 17 is positioned generally adjacent to the top side 13 of the reservoir. The overflow pipe 13 is connected to a main outlet for the dwelling in which the system 10 is located.

An inlet 18 for supplying gray-water to the reservoir is fluidly coupled to the intake pipe 15.

A conventional filtering means 20 is a filter for filtering the gray-water is fluidly coupled to the outlet pipe 16. The gray-water is filtered through the filter such that the filtered water is defined as processed gray-water to differentiate it from the pre-processed gray water which enters the filter.

A pumping means 22 draws the gray-water through the filtering means 20. The pumping means 22 is fluidly coupled to the filtering means 20 by a pipe. The pumping means 22 causes the gray-water to be drawn out of the reservoir 12 and through the filter.

A first valve 24 controls flow of the processed gray-water from the pumping means 22 and replaces it with fresh water if the supply of processed gray-water is less than is required. The first valve 24 has a first end 26, a second end 27 and middle section 28. The first valve 24 has a first 29 and second 30 plug therein which are both slidably mounted within the first valve 24. The first plug 29 is positioned between the first end 26 and the middle section 28. The second plug 30 is positioned between the second end 27 and the middle section 28. The first end 26 is fluidly coupled to the pumping means 22 by a pipe. The second end 27 is fluidly coupled to a fresh water inlet 32. The middle section 28 of the first valve 24 is fluidly coupled to a processed gray-water outlet 40. Fluid entering the first 26 and second 27 ends of the first valve 24 exits through the processed gray-water outlet 40. The first valve 24 has a water pressure sensing means 33 therein for detecting a loss of water pressure. The water pressure sensing means 33 is generally adjacent to the first end 26 of the valve 24. The first valve 24 has an actuating means 34 thereon for moving the second plug 30 between an open and a closed position. The actuating means 34 is preferably a conventional solenoid type switch. The solenoid is operationally coupled to the water pressure sensing means 33. If the pressure of the processed gray-water falls the solenoid will open the second plug 30 such that water from the fresh water inlet 32 may enter the processed gray-water outlet 40. The first plug 29 prevents water from the fresh water supply from traveling out of the first end 26 of the first valve 24. The processed gray-water outlet has a first one-way valve 41 therein for allowing flow of water in a first direction away from the first valve 24. The processed gray-water outlet 40 may supply water to such things as a toilet or a lawn watering system.

A pressure stabilizing means 50 for stabilizing the pressure of the processed gray-water leaving the processed gray-water outlet 40 and may be manually used to send fresh water into the processed gray-water outlet 40.

The pressure stabilizing means 50 contains a pressure valve 52. The pressure valve 52 is elongate and has a first end 53 and a second end 54. The pressure valve 52 has a first inlet port 55. The first inlet port 55 is generally positioned in a central portion of the pressure valve 52. A second inlet port 56 is located generally adjacent to the second end 54 of the pressure valve 52. An exit port 57 is in the second end 54 of the pressure valve 52. A stopper 58 is slidably movable within the pressure valve 52. The stopper 58 comprises a seal between the first 55 and second 56 inlet ports. The stopper 58 has a biasing means 59 thereon for biasing the stopper 58 toward the second inlet port 56. The biasing means 59 is a spring. The spring is coupled to a rod 60. The rod 60 is rotatably inserted in the first end 53 of the pressure valve 52 and is threaded so the rod 60 may be moved up and down with respect to the first end 53 of the pressure valve 52 and thus controlling flow of fluid through the second inlet port 56. Also, fluid entering through the first inlet port 55 under high pressure will push the stopper 58 down to lower the amount of fluid which may enter through the second inlet port 56.

A first pipe 62 has a first 63 and second end 64. The first end 63 is fluidly coupled to the first inlet port 55. The second end 64 is fluidly coupled to the processed gray-water outlet 40. The second end 64 is positioned between the first valve 24 and the first one-way valve 41.

A second pipe 66 has a first 67 and a second 68 end. The first end 67 is fluidly coupled to the fresh water inlet 32. The second end 68 is fluidly coupled to the second inlet port 56.

A third pipe 70 has a first end 71 and a second end 72. The first end 71 is fluidly coupled to the exit port 57, and the second end 72 is fluidly coupled to the processed gray-water outlet. The first one-way valve 41 is between the first 62 and third 70 pipes. The third pipe 70 has a second one-way valve 73 such that fluid traveling through the third pipe 70 travels in a direction from the first end 71 toward the second end 72 of the third pipe 70 and cannot enter the pressure valve 52 from the processed gray-water outlet 40.

The pressure valve 52 may be selectively adjusted to increase or decrease the water pressure in the processed gray-water outlet 40. It may also be used to increase the flow from the fresh water outlet 32 if the flow from the reservoir 12 is too low and the solenoid fails 34 so that the second plug 30 does not open to increase the fresh water flow.

The gray-water may be obtained from sources such as showers, sinks, washing machines and dish washers. The processed gray-water is generally intended to be used to supplement water used for toilets and lawn and garden care. Dedicated lines 76 may be run into the system 12 from wells, dams, rivers or other sources of gray-water to be treated by the system 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gray-water reclamation and reuse system, said system comprising:

a reservoir, said reservoir being adapted to treat gray-water, said reservoir having an intake pipe, an outlet pipe and an overflow pipe;

an inlet for supplying gray-water to said reservoir, said inlet being fluidly coupled to said intake pipe;

a filtering means for filtering said gray-water, said filtering means being fluidly coupled to said outlet pipe, said gray-water being filtered through said filter such that said filtered water is defined as processed gray-water;

a pumping means for drawing said gray-water through said filtering means, said pumping means being fluidly coupled to said filtering means by a pipe; and a first valve for controlling flow of said processed gray-water from said pumping means, said first valve having a first end, a second end and middle section, said first end being fluidly coupled to said pumping means by a pipe, said second end being fluidly coupled to a fresh water inlet, a middle section of said first valve being fluidly coupled to a processed gray-water outlet, said first valve having a first and second plug therein, said first plug being positioned between said first end and said middle section, said second plug being positioned between said second end and said middle section, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said processed gray-water falls said solenoid will open said second plug such that water from said fresh water inlet may enter said processed gray-water outlet.

2. The gray-water reclamation and reuse system as in claim 1, wherein said processed gray-water outlet has a first one-way valve therein for allowing flow of water in a first direction away from said first valve.

3. The gray-water reclamation and reuse system as in claim 2, further comprising:

a pressure stabilizing means for stabilizing the pressure of the processed gray-water leaving said processed gray-water outlet, said stabilizing means comprising:

a pressure valve, said pressure valve fluidly coupling said fresh water inlet and said processed gray-water outlet, said pressure valve being adapted to manually control the flow of water from said fresh water inlet into said processed gray-water outlet.

4. The gray-water reclamation and reuse system as in claim 3, wherein said pressure stabilizing means further comprises:

said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;

a first pipe, said first pipe having a first and second end, said first pipe first end being fluidly coupled to said first inlet port, said first pipe second end being fluidly coupled to said processed gray-water outlet, said first pipe second end being positioned between said first valve and said first one-way valve;

a second pipe, said second pipe having a first and second end, said second pipe first pipe first end being fluidly coupled to said fresh water inlet, said second pipe first pipe second end being fluidly coupled to said second inlet port; and a third pipe, said third pipe having a first end and a second end, said third pipe first end being fluidly coupled to said exit port, said third pipe second end being fluidly coupled to said processed gray-water outlet, said first one-way valve being between said first and third pipes, said third pipe having a second one-way valve such that fluid traveling through said third pipe travels in a direction from said third pipe first end toward said third pipe second end.

5. The gray-water reclamation and reuse system as in claim 1, further comprising:

a pressure stabilizing means for stabilizing the pressure of the processed gray-water leaving said processed gray-water outlet, said stabilizing means comprising:

a pressure valve, said pressure valve fluidly coupling said fresh water inlet and said processed gray-water outlet, said pressure valve being adapted to manually control the flow of water from said fresh water inlet into said processed gray-water outlet.

6. A gray-water reclamation and reuse system, said system comprising:

a reservoir, said reservoir being adapted to treat gray-water, said reservoir having a top side and a bottom side, said reservoir having an intake pipe, an outlet pipe and an overflow pipe, said outlet pipe being positioned generally adjacent to said bottom side of said reservoir, said overflow pipe being positioned generally adjacent to said top side of said reservoir;

an inlet for supplying gray-water to said reservoir, said inlet being fluidly coupled to said intake pipe;

a filtering means for filtering said gray-water, said filtering means being fluidly coupled to said outlet pipe, said gray-water being filtered through said filter such that said filtered water is defined as processed gray-water;

a pumping means for drawing said gray-water through said filtering means, said pumping means being fluidly coupled to said filtering means by a pipe, wherein said pumping means causes said gray-water to be drawn out of said reservoir and through said filter;

a first valve for controlling flow of said processed gray-water from said pumping means, said first valve having a first end, a second end and middle section, said first valve having a first and second plug therein, said first plug being positioned between said first end and said middle section, said second plug being positioned between said second end and said middle section, said first end being fluidly coupled to said pumping means by a pipe, said second end being fluidly coupled to a fresh water inlet, a middle section of said first valve being fluidly coupled to a processed gray-water outlet, wherein fluid entering said first valve exits through said processed gray-water outlet, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said processed gray-water falls said solenoid will open said second plug such that water from said fresh water inlet may enter said processed gray-water outlet, said processed gray-water outlet having a first one-way valve therein for allowing flow of water in a first direction away from said first valve, said processed gray-water outlet adapted to supply water to a toilet and a lawn watering system;

a pressure stabilizing means for stabilizing the pressure of the processed gray-water leaving said processed gray-water outlet, said stabilizing means comprising:

a pressure valve, said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;

a first pipe, said first pipe having a first and second end, said first pipe first end being fluidly coupled to said first inlet port, said first pipe second end being fluidly coupled to said processed gray-water outlet, said first pipe second end being positioned between said first valve and said first one-way valve;

a second pipe, said second pipe having a first and second end, said second pipe first end being fluidly coupled to said fresh water inlet, said second pipe second end being fluidly coupled to said second inlet port;

a third pipe, said third pipe having a first end and a second end, said third pipe first end being fluidly coupled to said exit port, said third pipe, second end being fluidly coupled to said processed gray-water outlet, said first one-way valve being between said first and third pipes, said third pipe having a second one-way valve such that fluid traveling through said third pipe travels in a direction from said third pipe, first end toward said third pipe second end; and wherein said pressure valve may be selectively adjusted to increase or decrease the water pressure of said processed gray-water outlet.

7. A gray-water reclamation and reuse system, said system comprising:

a reservoir adapted to treat gray-water having an intake pipe, an outlet pipe and an overflow pipe;

an inlet for supplying gray-water to said reservoir being fluidly coupled to said intake pipe;

a filtering means for filtering said gray-water being fluidly coupled to said outlet pipe, said gray-water being filtered through said filter such that said filtered water is defined as processed gray-water;

a pumping means for drawing said gray-water through said filtering means, said pumping means being fluidly coupled to said filtering means by a pipe;

a first valve for controlling flow of said processed gray water from said pumping means, said first valve being fluidly coupled to said pumping means, a fresh water inlet, and to a processed gray water outlet, said first valve having a water pressure sensing means therein for detecting a loss of water pressure, said first valve having a solenoid therein operationally coupled to said water pressure sensing means, a plug being positioned in said first valve for opening and closing said fresh water inlet, wherein if the pressure of said processed gray water falls said solenoid will open said plug such that water from said fresh water inlet may enter said processed gray water outlet; and a pressure stabilizing means having a first inlet port, a second inlet port and an exit port, said first inlet port and said exit port being coupled to said processed gray water outlet downstream of said first valve and said second inlet port being coupled to said fresh water inlet upstream of said first valve, wherein said pressure stabilizing means is adapted to allow fresh water to flow from said fresh water inlet to said processed gray water outlet in the event said solenoid fails to open said plug.

8. The gray-water reclamation and reuse system as in claim 7, wherein said processed gray-water outlet has a first one-way valve therein for allowing flow of water in a first direction away from said first valve.

9. The gray-water reclamation and reuse system as in claim 8, wherein said pressure stabilizing means stabilizes the pressure of the processed gray-water leaving said processed gray-water outlet and further comprises a pressure valve that includes said first and second inlet ports and said exit valve and is adapted to manually control the flow of water from said fresh water inlet into said processed gray-water outlet.

10. The gray-water reclamation and reuse system as in claim 9, wherein said pressure valve is elongate and further comprises:

a first end and a second end, said first inlet port being generally positioned in a central portion of said pressure valve, said second inlet port being located generally adjacent to said second end of said pressure valve, said exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;

a first pipe having a first end being fluidly coupled to said first inlet port and a second end being fluidly coupled to said processed gray-water outlet, said first pipe second end being positioned between said first valve and said first one-way valve;

a second pipe having a first end being fluidly coupled to said fresh water inlet and a second end being fluidly coupled to said second inlet port; and a third pipe having a first end being fluidly coupled to said exit port and a second end being fluidly coupled to said processed gray-water outlet, said first one-way valve being between said first and third pipes, said third pipe having a second one-way valve such that fluid traveling through said third pipe travels in a first direction from said third pipe first end toward said third pipe second end.

11. The gray-water reclamation and reuse system as in claim 7, wherein said pressure stabilizing means stabilizes the pressure of the processed gray-water outlet and further comprises a pressure valve that includes said first and second inlet ports and said exit valve and is adapted to manually control the flow of water from said fresh water inlet into said processed gray-water outlet.

*12. A gray-water reuse system, said system comprising:*

*a reservoir, said reservoir being adapted to receive gray-water, said reservoir having an intake pipe, an outlet pipe and an overflow pipe;*

*an inlet for supplying gray-water to said reservoir, said inlet being fluidly coupled to said intake pipe;*

*a pumping means for pumping said gray-water from said reservoir; and*

*a first valve for controlling flow of said gray-water from said pumping means, said first valve having a first end, a second end and middle section, said first end being fluidly coupled to said pumping means by a pipe, said second end being fluidly coupled to a fresh water inlet, a middle section of said first valve being fluidly coupled to a gray-water outlet, said first valve having a first and second plug therein, said first plug being positioned between said first end and said middle section, said second plug being positioned between said second end and said middle section, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said gray-water falls said solenoid will open said second plug such that water from said fresh water inlet may enter said gray-water outlet.*

*13. The gray-water reuse system as in claim 12, wherein said gray-water outlet has a first one-way valve therein for allowing flow of water in a first direction away from said first valve.*

*14. The gray-water reuse system as in claim 13, further comprising:*

*a pressure stabilizing means for stabilizing the pressure of the gray-water leaving said gray-water outlet, said stabilizing means comprising:*

*a pressure valve, said pressure valve fluidly coupling said fresh water inlet and said gray-water outlet, said pressure valve being adapted to manually control the flow of water from said fresh water inlet into said gray-water outlet.*

*15. The gray-water reuse system as in claim 14, wherein said pressure stabilizing means further comprises:*

*said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe, said first pipe having a first and second end, said first pipe first end being fluidly coupled to said first inlet port, said first pipe second end being fluidly coupled to said gray-water outlet, said first pipe second end being positioned between said first valve and said first one-way valve;*

*a second pipe, said second pipe having a first and second end, said second pipe first pipe first end being fluidly coupled to said fresh water inlet, said second pipe first pipe second end being fluidly coupled to said second inlet port; and*

*a third pipe, said third pipe having a first end and a second end, said third pipe first end being fluidly coupled to said exit port, said third pipe second end being fluidly coupled to said gray-water outlet, said first one-way valve being between said first and third pipes, said third pipe having a second one-way valve such that fluid traveling through said third pipe travels in a direction from said third pipe first end toward said third pipe second end.*

*16. The gray-water reuse system as in claim 12, further comprising:*

*a pressure stabilizing means for stabilizing the pressure of the gray-water leaving said gray-water outlet, said stabilizing means comprising:*

*a pressure valve, said pressure valve fluidly coupling said fresh water inlet and said gray-water outlet, said pressure valve being adapted to manually control the flow of water from said fresh water inlet into said gray-water outlet.*

*17. A gray-water reuse system, said system comprising:*

*a reservoir, said reservoir having a top side and a bottom side, said reservoir having an intake pipe, an outlet pipe and overflow pipe, said outlet pipe being positioned generally adjacent to said bottom side of said reservoir, said overflow pipe being positioned generally adjacent to said top side of said reservoir;*

*an inlet for supplying gray-water to said reservoir, said inlet being fluidly coupled to said intake pipe;*

*a pumping means for pumping said gray-water from said reservoir;*

*a first valve for controlling flow of said gray-water from said pumping means, said first valve having a first end, a second end and middle section, said first valve having a first and second plug therein, said first plug being positioned between said first end and said middle section, said second plug being positioned between said second end and said middle section, said first end being fluidly coupled to said pumping means by a pipe, said second end being fluidly coupled to a fresh water inlet, a middle section of said first valve being fluidly coupled to a processed gray-water outlet, wherein fluid entering said first valve exits through said gray-water outlet, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said processed gray-water falls said solenoid will open said second plug such that water from said fresh water inlet may enter said gray-water outlet, said gray-water outlet having a first one-way valve therein for allowing flow of water in a first direction away from said first valve, said gray-water outlet adapted to supply water to a toilet and a lawn watering system;*

*a pressure stabilizing means for stabilizing the pressure of the gray-water leaving said gray-water outlet, said stabilizing means comprising:*

*a pressure valve, said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe, said first pipe having a first and second end, said first pipe first end being fluidly coupled to said first inlet port, said first pipe second end being fluidly coupled to said gray-water outlet, said first pipe second end being positioned between said first valve and said first one-way valve;*

*a second pipe, said second pipe having a first and second end, said second pipe first end being fluidly coupled to said fresh water inlet, said second pipe end being fluidly coupled to said second inlet port;*

*a third pipe, said third pipe having a first end and a second end, said third pipe first end being fluidly coupled to said exit port, said third pipe, second end being fluidly coupled to said gray-water outlet, said first one-way valve b pipes, said third pipe having a second one-way valve such that fluid traveling through said third pipe travels in a direction from said third pipe, first end toward said third pipe second end; and*

*wherein said pressure valve may be selectively adjusted to increase or decrease the water pressure of said gray-water outlet.*

*18. A gray-water reuse system, said system comprising:*

*a reservoir having an intake pipe, an outlet pipe and an overflow pipe;*

*an inlet for supplying gray-water to said reservoir being fluidly coupled to said intake pipe;*

*a pumping means for pumping said gray-water from said reservoir;*

*a first valve for controlling flow of said gray water from said pumping means, said first valve being fluidly coupled to said pumping means, a fresh water inlet, and to a gray water outlet, said first valve having a water pressure sensing means therein for detecting a loss of water pressure, said first valve having a solenoid therein operationally coupled to said water pressure sensing means, a plug being positioned in said first valve for opening and closing said fresh water inlet, wherein if the pressure of said gray water falls said solenoid will open said plug such that water from said fresh water inlet may enter said gray water outlet; and*

*a pressure stabilizing means having a first inlet port, a second inlet port and an exit port, said first inlet port and said exit port being coupled to said gray-water outlet downstream of said first valve and said second inlet port being coupled to said fresh water inlet upstream of said first valve, wherein said pressure stabilizing means is adapted to allow fresh water to flow from said fresh water inlet to said gray-water outlet in the event said solenoid fails to open said plug.*

*19. The gray-water reuse system as in claim 18, wherein said gray-water outlet has a first one-way valve therein for allowing flow of water in a first direction away from said first valve.*

*20. The gray-water reuse system as in claim 19, wherein said pressure stabilizing means stabilizes the pressure of the gray-water leaving said gray-water outlet and further comprises a pressure valve that includes said first and second inlet ports and said exit valve and is adapted to manually control the flow of water from said fresh water inlet into said gray-water outlet.*

*21. The gray-water reuse system as in claim 20, wherein said pressure valve is elongate and further comprises:*

*a first end and a second end, said first inlet port being generally positioned in a central portion of said pressure valve, said second inlet port being located generally adjacent to said second end of said pressure valve, said exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe having a first end being fluidly coupled to said first inlet port and a second end being fluidly coupled to said gray-water outlet, said first pipe second end being positioned between said first valve and said first one-way valve;*

*a second pipe having a first end being fluidly coupled to said fresh water inlet and a second end being fluidly coupled to said second inlet port; and*

*a third pipe having a first end being fluidly coupled to said exit port and a second end being fluidly coupled to said gray-water outlet, said first one-way valve being between said first and third pipes, said third pipe having a second one-way valve such that fluid traveling through said third pipe travels in a first direction from said third pipe first end toward said third pipe second end.*

*22. The gray-water reuse system as in claim 18, wherein said pressure stabilizing means stabilizes the pressure of the gray-water outlet and further comprises a pressure valve that includes said first and second inlet ports and said exit valve and is adapted to manually control the flow of water from said fresh water inlet into said gray-water outlet.*

*23. A gray-water reclamation and reuse system, said system comprising:*

*an inlet for supplying gray-water to said system;*

*a pumping means for pumping said gray-water from said inlet; and*

*a first valve for controlling flow of said gray-water from said pumping means, said first valve having a first end, a second end and middle section, said first end being fluidly coupled to said pumping means by a pipe, said second end being fluidly coupled to a fresh water inlet, a middle section of said first valve being fluidly coupled to a gray-water outlet, said first valve having a first and second plug therein, said first plug being positioned between said first end and said middle section, said second plug being positioned between said second end and said middle section, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said gray-water falls said solenoid will open said second plug such that water from said fresh water inlet may enter said gray-water outlet.*

*24. The gray-water reuse system as in claim 23, wherein said gray-water outlet has a first one-way valve therein for allowing flow of water in a first direction away from said first valve.*

*25. The gray-water reuse system as in claim 24, further comprising:*

*a pressure stabilizing means for stabilizing the pressure of the gray-water leaving said gray-water outlet, said stabilizing means comprising:*

*a pressure valve, said pressure valve fluidly coupling said fresh water inlet and said gray-water outlet, said pressure valve being adapted to manually control the flow of water from said fresh water inlet into said gray-water outlet.*

*26. The gray-water reuse system as in claim 25, wherein said pressure stabilizing means further comprises:*

*said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe, said first pipe having a first and second end, said first pipe first end being fluidly coupled to said first inlet port, said first pipe second end being fluidly coupled to said gray-water outlet, said first pipe second end being positioned between said first valve and said first one-way valve;*

*a second pipe, said second pipe having a first and second end, said second pipe first pipe first end being fluidly coupled to said fresh water inlet, said second pipe first pipe second end being fluidly coupled to said second inlet port; and*

*a third pipe, said third pipe having a first end and a second end, said third pipe first end being fluidly coupled to said exit port, said third pipe second end being fluidly coupled to said gray-water outlet, said first one-way valve being between said first and third pipes, said third pipe having a second one-way valve such that fluid traveling through said third pipe travels in a direction from said third pipe first end toward said third pipe second end.*

*27. The gray-water reuse system as in claim 23, further comprising:*

*a pressure stabilizing means for stabilizing the pressure of the gray-water leaving said gray-water outlet, said stabilizing means comprising:*

*a pressure valve, said pressure valve fluidly coupling said fresh water inlet and said gray-water outlet, said pressure valve being adapted to annually control the flow of water from said fresh water inlet into said gray-water outlet.*

*28. A gray-water reuse system, said system comprising:*

*an inlet for supplying gray-water to said system;*

*a pumping means for pumping said gray-water from said inlet;*

*a first valve for controlling flow of said gray-water from said pumping means, said first valve having a first end, a second end and middle section, said first valve having a first and second plug therein, said first plug being positioned between said first end and said middle section, said second plug being positioned between said second end and said middle section, said first end being fluidly coupled to said pumping means by a pipe, said second end being fluidly coupled to a fresh water inlet, a middle section of said first valve being fluidly coupled to a gray-water outlet, wherein fluid entering said first valve exits through said gray-water outlet, said first valve having a water pressure sensing means therein for detecting a loss of water pressure, said water pressure sensing means being generally adjacent to said first end of said valve, said first valve having an actuating means therein for moving said second plug between an open and a closed position, said actuating means being a solenoid, said solenoid being operationally coupled to said water pressure sensing means, wherein if the pressure of said gray-water falls said solenoid will open said second plug such that water from said fresh water inlet may enter said gray-water outlet, said gray-water outlet having a first one-way valve therein for allowing flow of water in a first direction away from said first valve, said gray-water outlet adapted to supply water to a toilet and a lawn watering system;*

*a pressure stabilizing means for stabilizing the pressure of the gray-water leaving said gray-water outlet, said stabilizing means comprising:*

*a pressure valve, said pressure valve being elongate and having a first end and a second end, said pressure valve having a first inlet port, said first inlet port being generally positioned in a central portion of said pressure valve, a second inlet port being located generally adjacent to said second end of said pressure valve, an exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe, said first pipe having a first and second end, said first pipe first end being fluidly coupled to said first inlet port, said first pipe second end being fluidly coupled to said gray-water outlet, said first pipe second end being positioned between said first valve and said first one-way valve;*

*a second pipe, said second pipe having a first and second end, said second pipe first end being fluidly coupled to said fresh water inlet, said second pipe second end being fluidly coupled to said second inlet port;*

*a third pipe, said third pipe having a first end and a second end, said third pipe first end being fluidly coupled to said exit port, said third pipe, second end being fluidly coupled to said gray-water outlet, said first one-way valve being between said first and third pipes, said third pipe having a second one-way valve such that fluid traveling through said third pipe travels in a direction from said third pipe, first end toward said third pipe second end; and*

*wherein said pressure valve may be selectively adjusted to increase or decrease the water pressure of said gray-water outlet.*

*29. A gray-water reuse system, said system comprising:*

*an inlet for supplying gray-water to said system;*

*a pumping means for pumping said gray-water from said inlet;*

*a first valve for controlling flow of said gray water from said pumping means, said first valve being fluidly coupled to said pumping means, a fresh water inlet, and to a gray water outlet, said first valve having a water pressure sensing means therein for detecting a loss of water pressure, said first valve having a solenoid therein operationally coupled to said water pressure sensing means, a plug being positioned in said first valve for opening and closing said fresh water inlet, wherein if the pressure of said gray water falls said solenoid will open said plug such that water from said fresh water inlet may enter said processed gray water outlet; and*

*a pressure stabilizing means having a first inlet port, a second inlet port and an exit port, said first inlet port and said exit port being coupled to said gray water outlet downstream of said first valve and said second inlet port being coupled to said fresh water inlet upstream of said first valve, wherein said pressure stabilizing means is adapted to allow fresh water to flow from said fresh water inlet to said gray water outlet in the event said solenoid fails to open said plug.*

*30. The gray-water reuse system as in claim 29, wherein said gray-water outlet has a first one-way valve therein for allowing flow of water in a first direction away from said first valve.*

*31. The gray-water reuse system as in claim 29, wherein said pressure stabilizing means stabilizes the pressure of the gray-water leaving said gray-water outlet and further comprises a pressure valve that includes said first and second inlet ports and said exit valve and is adapted to manually*

*control the flow of water from said fresh water inlet into said gray-water outlet.*

*32. The gray-water reuse system as in claim 29, wherein said pressure valve is elongate and further comprises:*

*a first end and a second end, said first inlet port being generally positioned in a central portion of said pressure valve, said second inlet port being located generally adjacent to said second end of said pressure valve, said exit port being in said second end of said pressure valve, a stopper being slidably movable within said pressure valve, said stopper comprising a seal between said first and second inlet ports, said stopper having a biasing means thereon for biasing said stopper toward said second inlet port, said biasing means being a spring, said spring being coupled to a rod, said rod being rotatably inserted in said first end of said pressure valve, said rod being threaded;*

*a first pipe having a first end being fluidly coupled to said first inlet port and a second end being fluidly coupled to said gray-water outlet, said first pipe second end being positioned between said first valve and said first one-way valve;*

*a second pipe having a first end being fluidly coupled to said fresh water inlet and a second end being fluidly coupled to said second inlet port; and*

*a third pipe having a first end being fluidly coupled to said exit port and a second end being fluidly coupled to said gray-water outlet, said first one-way valve being between said first and third pipes, said third pipe having a second one-way valve such that fluid traveling through said third pipe travels in a first direction from said third pipe first end toward said third pipe second end.*

*33. The gray-water reuse system as in claim 29, wherein said pressure stabilizing means stabilizes the pressure of the gray-water outlet and further comprises a pressure valve that includes said first and second inlet ports and said exit valve and is adapted to manually control the flow of water from said fresh water inlet into said gray-water outlet.*

* * * * *